United States Patent Office 3,498,330
Patented Mar. 3, 1970

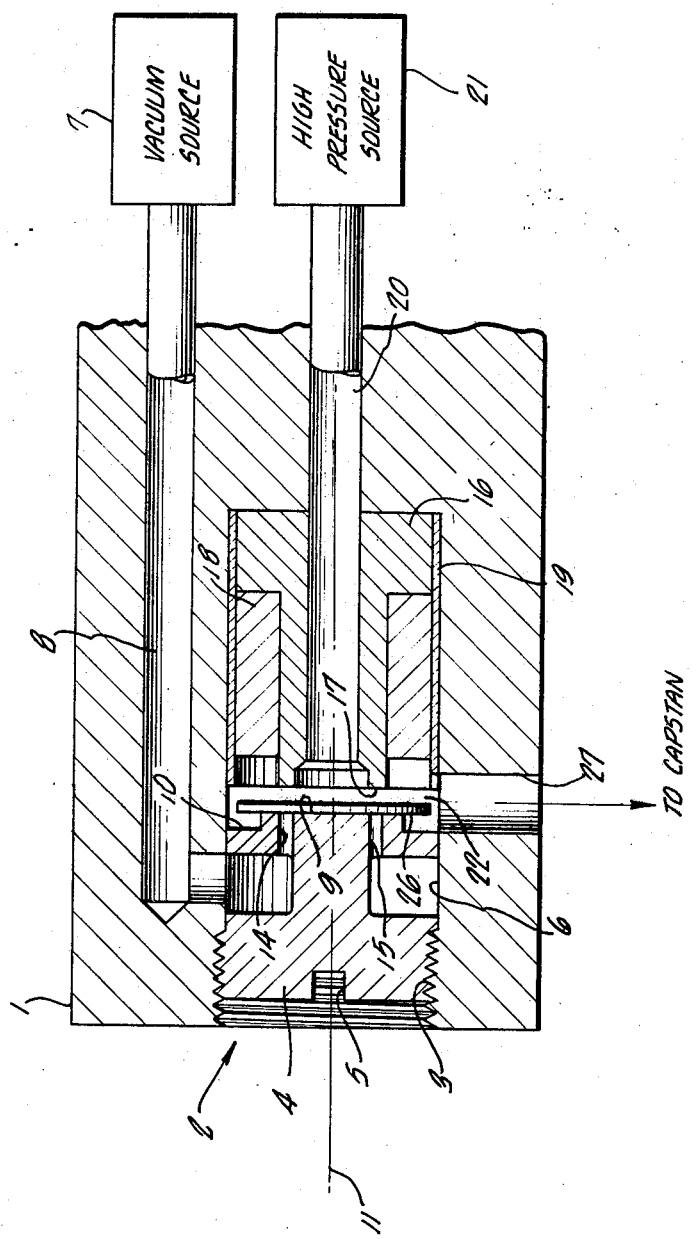

3,498,330
HIGH-SPEED PNEUMATIC VALVE
Walter Griffin Paige, Pasadena, Calif., assignor to Burroughs Corporation, Detroit, Mich., a corporation of Michigan
Filed Mar. 27, 1967, Ser. No. 626,261
Int. Cl. F17d 3/00; F16k 31/06
U.S. Cl. 137—625.65                      4 Claims

ABSTRACT OF THE DISCLOSURE

One end of a cylindrical chamber in which a disc valve moves is defined by a threaded plug. In one position the disc valve is seated on the surface of the plug. The distance of travel of the disc valve is adjusted by screwing the plug in and out of the chamber. The surfaces on which the disc valve is seated in its two positions protrude from the ends of the chamber to define annular grooves. These grooves provide a wider passage for the radially moving air passing through the valve without increasing the distance of travel of the valve.

BACKGROUND OF THE INVENTION

This invention relates to pneumatic control devices and, more particularly, to improvements in high-speed electromagnetically actuated disc valves.

Recently pneumatic capstans have been developed for transporting magnetic tape in data handling systems. In its surface the capstan has openings that are alternatively connected by a pneumatic valve to a source of air at high pressure or to a source of air at low pressure. Upon connection of the low-pressure source to the capstan, the tape to be transported is drawn into engagement with the capstan and moves in substantially nonslipping contact with the capstan as it rotates. Upon connection of the high-pressure source, the tape is repelled from the surface of the capstan and remains stationary while the capstan rotates.

To control the quick stops and starts demanded in a high-speed data handling system, an extremely fast responding high-speed pneumatic valve is required. For the most part, a free-moving disc valve of the type disclosed in R. A. Pendleton Patent 3,204,843, issued Sept. 7, 1965, has been employed. The disc is made from a ferromagnetic material. It moves axially within a cylindrical valve chamber having an opening connected to a low-pressure source at one end and an opening connected to a high-pressure source at the other end. Normally, the valve is seated over the opening connected to the low-pressure source, thereby permitting air to flow from the high-pressure source into the cylindrical chamber and radially from the chamber toward a conduit leading to the capstan. To engage the tape, an electromagnet is energized. The disc is thereby attracted to the opposite end of the cylinder so it is seated over the opening connected to the high-pressure source. Thus, air is drawn from the capstan to the conduit, radially through the valve chamber, and into the opening connected to the low-pressure source.

The described valve responds relatively quickly to commands because the disc is lightweight and the electromagnet produces a large magnetic field. The axial length of the valve chamber also affects the response time of the valve. If the axial length is large, the disc must travel a long distance between its two rest positions. This slows down the response of the pneumatic capstan to commands to engage and disengage tape. But if the axial length of the valve chamber is too short, the air traveling radially through the chamber becomes constricted. This may reduce the flow of air between the capstan and the source to the point where it is not able to control the tape effectively. Accordingly, the length of the valve chamber must be carefully designed so on the one hand the speed of response of the valve is satisfactory and on the other hand the force exerted on the tape by the air from the capstan is sufficient to establish positive engagement and disengagement.

SUMMARY OF THE INVENTION

According to the invention, a disc valve is provided in which the axial length of the valve chamber is adjustable. Preferably, the surface of one end of the chamber is formed by a threaded plug capable of moving through a partially threaded cavity in the valve housing that defines the chamber. In this way, the valve can be adjusted in each case to provide the response time and force on the tape desired.

A feature of the invention is the construction of the chamber so the seating surfaces for the disc protrude from the ends of the chamber. This results in a wider passage for the radially moving air in part of the chamber without increasing the axial distance between the surfaces on which the disc seats.

BRIEF DESCRIPTION OF THE DRAWING

The features of a specific embodiment of the invention are illustrated in the drawing, the single figure of which is a side elevation view in section of a disc valve.

DESCRIPTION OF A SPECIFIC EMBODIMENT

In the drawing, a valve housing 1 is shown. Housing 1 has a cylindrical cavity 2 with an axis 11. A portion 3 of cavity 2 is threaded. A partially threaded plug 4 fits in cavity 2 with its threads in engagement with the threads of portion 3. The head of plug 4, which is exposed to the exterior of valve housing 1, is provided with a recess 5 to facilitate screw adjustment of the position of plug 4. Midway between its ends, plug 4 has an annular recess 6 that is connected to a vacuum source 7 by a conduit 8 running into body 1. The interior end of plug 4 has a circular surface 9 that protrudes further into cavity 2 than an annular surface 10, which forms the periphery of the interior end of plug 4. As a result of this construction, the interior end of plug 4 and the surface of cavity 2 form an annular groove. A plurality of openings such as those designated 14 and 15 connect recess 6 with the interior of cavity 2.

A hollow cylindrical ferromagnetic slug 16 extends from the innermost end of cavity 2 toward plug 4. Slug 16 has an annular end surface 17 that lies across from surface 9 a short distance therefrom. An electromagnet 18 fits over slug 16. A sleeve 19 surrounds electromagnet 18. Surface 17 of slug 16 and the end of sleeve 19 protrude beyond the end of electromagnet 18 to form an annular recess or groove. A valve chamber 22 is defined by the interior end of plug 4, the cylindrical surface of cavity 2, the end surface of electromagnet 18, and surface 17. A conduit 20, which runs through the hollow center of slug 16, connects valve chamber 22 with a high-pressure source 21. A free-moving ferromagnetic disc 26 is adapted to move within valve chamber 22 along axis 11. A conduit 27, which opens into cavity 2 from its side surface, connects valve chamber 22 with the openings in the capstan (not shown).

The combined effect of vacuum source 7 and high-pressure source 21 holds disc 26 so it is normally seated on surface 9. In this position openings 14 and 15 are blocked, so air passes from source 21 into valve chamber 22 and thereafter radially from valve chamber 22 to conduit 27. All the components of the valve with the exception of electromagnet 18, slug 16, and sleeve 19 are non-magnetic material such as aluminum. When electromagnet 18 is actuated, a magnetic field is developed that attracts disc 26. As a result, disc 26 becomes seated on surface 17 and blocks conduit 20. When disc 26 is in this position, air is withdrawn from conduit 27. It passes through a slot in sleeve 19 into valve chamber 22, radially through valve chamber 22 into openings 14 and 15, and thereafter through conduit 8 to vacuum source 7.

The distance of travel of disc 26 between surface 9 and surface 17 determines in part the speed of response of the valve. It also determines in part the volume of air flowing through the valve. The distance between surfaces 9 and 17 is adjusted by screwing plug 4 in or out of cavity 2 to obtain the best compromise between the response time and air flow in each case. For a given distance between surfaces 9 and 17, the air flow is increased while disc 26 is seated on surface 17 by the annular groove formed by the interior end of plug 4 and the surface of cavity 2. Similarly, the air flow is increased while disc 26 is seated on surface 9 by the annular groove formed by the ends of electromagnet 18, slug 16, and sleeve 19.

I claim:
1. A pneumatic valve comprising:
   a housing with walls defining a cylindrical chamber, the chamber having a cylindrical side wall, the chamber having end walls with first and second centrally located valve seating surfaces that protrude toward each other to form with the side wall annular grooves around the seating surfaces;
   a first opening formed in the first seating surface for coupling to a vacuum source;
   a second opening formed in the second seating surface for coupling to a high pressure source;
   a conduit opening into the chamber from the cylindrical side wall;
   a disc disposed in the chamber, the seating surfaces of the end walls being displaced apart greater than the thickness of the disc and the disc being freely movable therebetween; and
   electromagnetic means for drawing the disc against the second seating surface to close the second opening.

2. The valve of claim 1, in which one end of the chamber is formed by a plug having a threaded fitting with the housing, the plug being movable toward the other end of the chamber as it is screwed.

3. The valve of claim 1, wherein the opening of said conduit straddles said disc when positioned against the seating surfaces of either of said end walls.

4. The valve of claim 3, wherein the center of the opening of said conduit is approximately midway between the seating surfaces of said end walls.

References Cited
UNITED STATES PATENTS

| | | | |
|---|---|---|---|
| 1,914,123 | 6/1933 | Hapgood | 251—141 XR |
| 2,267,515 | 12/1941 | Wilcox et al. | 137—625.65 |
| 2,860,850 | 11/1958 | Rhodes et al. | 251—141 XR |
| 2,914,034 | 11/1959 | Becker | 137—625.65 |
| 3,204,843 | 9/1965 | Pendleton | 226—95 |
| 3,245,652 | 4/1966 | Roth | 251—139 |

HENRY T. KLINKSIEK, Primary Examiner

U.S. Cl. X.R.
251—139, 141